US006216536B1

United States Patent
Manseth

(12) United States Patent
(10) Patent No.: US 6,216,536 B1
(45) Date of Patent: Apr. 17, 2001

(54) SIDESLIP INDICATOR FOR A SNOW SKI

(76) Inventor: Karl J. Manseth, 33666 McKenzie View Dr., Eugene, OR (US) 97408

( * ) Notice: Subject to any disclaimer, the term of this patent is extended or adjusted under 35 U.S.C. 154(b) by 0 days.

(21) Appl. No.: 09/359,802

(22) Filed: Jul. 26, 1999

(51) Int. Cl.$^7$ .................................................. G01P 15/00
(52) U.S. Cl. .................................... 73/490; 280/809
(58) Field of Search ............... 73/488, 490; 280/601, 280/809

(56) References Cited

U.S. PATENT DOCUMENTS

| | | | |
|---|---|---|---|
| 3,505,878 | 4/1970 | Moll | 73/490 |
| 3,888,500 | 6/1975 | Gauthier | 280/11.37 |
| 4,088,019 | 5/1978 | Mascia | 73/180 |
| 4,546,650 | * 10/1985 | Cameron | 73/490 |
| 4,860,585 | * 8/1989 | Tuyn et al. | 73/493 |
| 4,864,860 | 9/1989 | Manseth | 73/490 |

* cited by examiner

Primary Examiner—Richard A. Moller
(74) Attorney, Agent, or Firm—James D. Givnan, Jr.

(57) ABSTRACT

A plate mounted turntable is carried on the trailing end of a ski and rotatably supports a carrier having a rotary position sensor thereon. The carrier additionally supports an arm assembly which includes wheels or a skid for penetration of a snow surface. A portion of the rotary position indicator remains fixed during arcuate travel of the carrier and attached arm assembly in response to lateral loads applied to the arm assembly during ski travel. Resilient members ensure arm assembly contact with a snow or other surface and return of the carrier to a neutral position in the absence of lateral loads. A lock maintains the arm assembly in a raised, inoperative position. Signals produced by the rotary position sensor, during lateral arm movement, are conducted to a data logger for storage therein and for ultimate downloading to a personal computer. Signals produced by the sensor indicate both extent of lateral movement of the arm assembly as well as duration of same. A power source is carried by the plate structure for energizing the sensor.

10 Claims, 1 Drawing Sheet

SIDESLIP INDICATOR FOR A SNOW SKI

BACKGROUND OF THE INVENTION

The present invention concerns equipment such as skis and snowboards which, during the execution of a turn, necessarily incur a degree of sideslip. Of interest to someone attempting to perfect their skiing technique is the amount of sideslip or skidding of the skis during a turn. Good skiers execute turns with minimal sideslip to avoid loss of speed, while intentional sideslipping or skidding is an accepted way of killing speed prior to stopping.

In the prior art, U.S. Pat. No. 3,505,878 discloses a speed and distance indicator pivotally carried on the tail of a ski and equipped with a pair of wheels for contact with the snow surface. U.S. Pat. No. 3,888,500 shows a ski boot actuated device for indicating the displacement of boot during execution of a turn. U.S. Pat. No. 4,864,860, issued to the present inventor, discloses an electrical generator assembly swingably carried on the tail of a snow ski. The generator can pivot, in response to side imparted loads during a turn, about an upright axis. U.S. Pat. No. 4,088,019 discloses a device for sensing true leeway of a vessel in relationship to a vessel centerline. A servomechanism maintains a vane of the device vertical.

SUMMARY OF THE PRESENT INVENTION

The present invention is directed toward providing an indication to a skier or ski coach the extent to which the skier is encountering lateral displacement or skidding of a ski as opposed to desired tracking of the skis generally along the ski centerline.

With the introduction of snow skis having a significant taper in width from tip to the mid-section of the ski and a flexibility of the skis it has become possible to execute turns essentially by a rolling ski about its longitudinal axis to cause a frontal edge of the ski to penetrate the snow to accomplish a change in ski direction. Previously turns were effected with considerable transverse movement or side slipping of the ski.

In the present invention an arm of the device is displaced from a ski centerline by side loads encountered during execution of a turn resulting in a sensor providing a signal corresponding to the extent and duration of arm displacement. A lowermost arm component may be embodied in a wheel or a slide and may be spring biased to ensure desired ground contact. Carrier means supports a rotary transducer on a ski mounted base plate. The carrier and transducer move about an upright axis while a shaft of the sensor is fixed. The arm of the device is biased downwardly for positive contact with the surface of snow, ice, etc. Signals emanating from the transducer during arm displacement may be stored on a data logger.

DETAILED DESCRIPTION OF THE PREFERRED EMBODIMENTS

Figure 1:
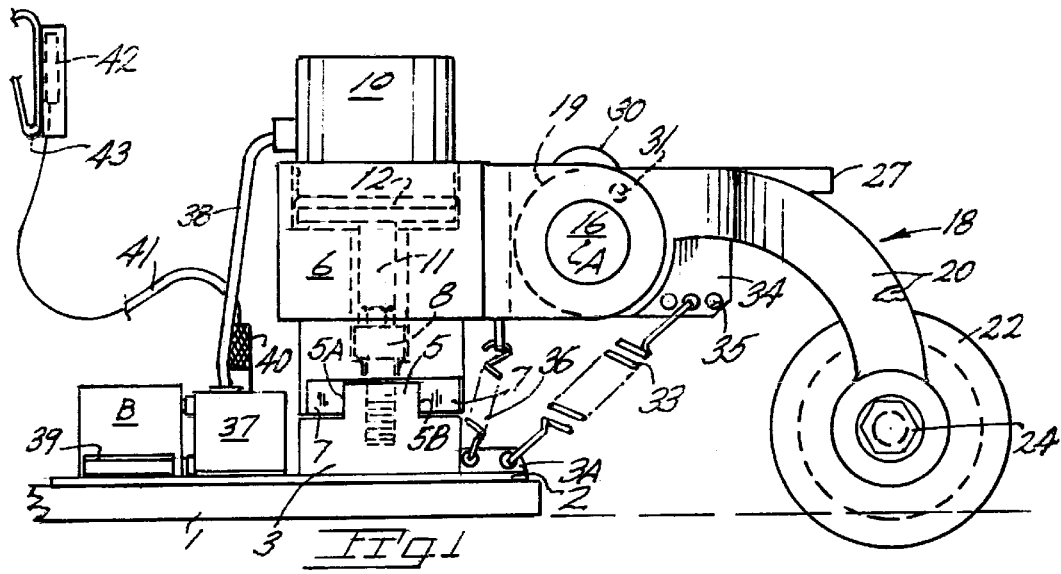
FIG. 1 is a side elevational view of the present device in place on a ski.

With continuing attention to the drawings, wherein applied reference numerals indicate parts similarly hereinafter identified, the reference numeral 1 indicates a rear end segment of a ski. In place on the ski segment is a base plate 2 on which is suitably secured a turntable at 3 with a pair of stops as at 5 which provide limit stop surfaces 5A for contacting by lugs 7 depending from a carrier member 6. Centrally located of turntable 4 and carrier 6 is a socket head cap screw 8 having a threaded end seated in turntable 3. Accordingly carrier 6 may rotate in an arcuate fashion through a range of approximately 60° on either side of a centerline CL of ski 1. Cap screw 8, when seated in threaded engagement with the turntable, permits carrier 6 to freely pivot in response to later described components of the present device.

Figure 2:
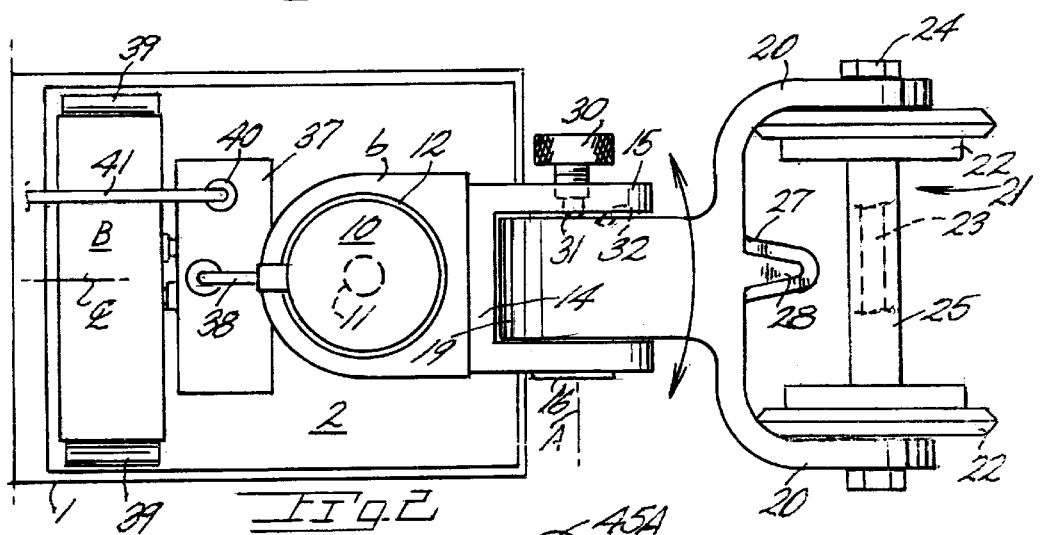
FIG. 2 is a plan view of FIG. 1.

In place on carrier 6 is a rotary position sensor 10 having a shaft 11 extending into inserted engagement with a wall defined recess in the head of cap screw 8. An O-ring 12 holds the sensor in place in a friction fit. Accordingly carrier 6 and sensor 10 may swing to either side of the ski centerline CL as indicated in FIG. 2. Such movement is about fixed sensor shaft 11. Projecting rearwardly from carrier 6 is a clevis structure 14 including arms 15 which carry a pivot pin 16.

An arm assembly generally at 18 includes a boss 19 in place on pivot pin 16 and which is integral with rearwardly trailing arms 20 forming a yoke. A wheel assembly at 21 includes wheels 22 in place on an axle 23 carried by arms 20 as by a fastener assembly 24. A spacer is at 25. A tang at 27 provides a projection engageable with the basket of a ski pole to permit lifting of the arm assembly about the axis A of pivot pin 16. Conversely, a ski pole point may be inserted into a recessed area 28 of the tang to facilitate positioning of the arm assembly in a down operative position. When in an inoperative raised position, arm assembly 18 is held in place by a lock 30 which includes a spring biased catch 31 which seats in a detent 32 in boss 19. Lock 30 is threaded to permit adjustable loading of catch 31. A tension spring 33 extends intermediate a flange 3A on base 3 and a plate 34 on the arm assembly to bias same downwardly about the axis of pivot pin 16 to ensure desired contact of wheels 22 with a snow surface. Such tensioning is adjustable by reason of apertures as at 35 on plate 34 being spaced differently from the axis A of pin 16. Further, spring 33 may be readily replaced by a like spring of different tension.

What may be termed as a centering spring is indicated at 36 and extends intermediate base 3 and clevis structure 14 and is of the tension type to urge the arm assembly toward a centered position relative the ski centerline. Similar to spring 33, spring 36 is readily changeable for desired action on the arm assembly.

Rotary position sensor 10 may be a rotary variable inductance transformer served by a +5 VDC source such as a battery pack at B in circuit with the sensor via a connector block 37 and a lead wire within an an insulative sheath 38. Spring clips at 39 hold battery pack B in place on plate 2. Output current from sensor 10 occurring during arm assembly travel and movement of carrier 6 about shaft 11 will be a linear 0 to +3VDC or 0 to −3VDC up to 60 degrees during travel in opposite directions from a neutral or centered position. A jack at 40 on an insulated lead 41 conducts current flow to a data storage or data logger device 42, of the stand-alone type, which may be attached to the skier's back as by straps 43. The data logger is suitably programmed and has a PC-card slot which accepts a solid state or hard disk drive. One such device is manufactured and sold under the trademark Log Book 300 by the IOtech Corporation. Large amounts of data may thus be stored independently of a PC and hence provides remote data acquisition during use of the present sideslip indicator on a ski run. The skier or ski instructor may critique the run upon reviewing of the PC displayed data.

Figure 3:
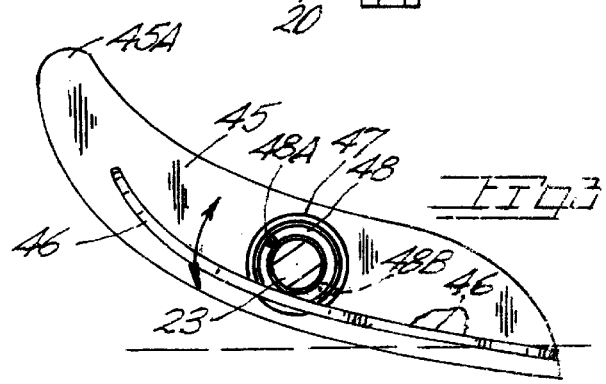
FIG. 3 is a side elevational view of a skid for contact with a snow surface.

In FIG. 3 I show a keel 45 in place on axle 23 with skids at 46 being on opposite sides of the keel. Keel use is alternative to use of the wheels 22 as when snow conditions require additional surface area for tracking purposes. Keel 45 includes a collar 47 on axle 23. A torsion spring 48 having ends 48A–48B one each terminating in seated engagement with a yoke arm 20 and with an end of collar 47 biases the tip 45A of keel 45 upwardly so as to ride on a surface. A cotter pin (not shown) through axle 23 confines the keel against disengagement from the torsion spring.

In operation of the indicator, the skier is provided a data logger 42 and base plate 2 suitably installed on the trailing end of a ski. Such installation may be permanent or temporary. In the latter instance, cooperating fabric closure pieces may be utilized on the ski and the underside of plate 2 and the wheels 22 or keel 45 checked for penetration of a snow surface along with spring 36 to ensure return of arm assembly 18 to the neutral or center position. During the run the lateral displacement of arm assembly 18 will produce the signals above noted over a timed interval, normally the duration of the ski run. The data recorded in the data logger 42 may ultimately be transferred to a personal computer whereat a comparison may be made to data recorded in logger 42 during a run over the same course by the instructor and earlier stored in the computer.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A device for attachment to a ski to determine the extent of displacement of the ski during a ski run in a lateral direction over a surface away from a line containing the major axis of the ski, said device comprising, a base for placement on said ski, carrier means on said base, means for rotatably securing said carrier means to said base permitting arcuate travel of the carrier about an upright axis, a rotary position sensor in place on said carrier means and in circuit with a power source and having an output signal proportional to the extent of arcuate travel of said sensor and said carrier means relative to the longitudinal axis of the ski, said carrier means including an arm assembly having a surface penetrating member responsive to loads imparted laterally thereto during a ski run for arm assembly travel about said upright axis, and means for storing the signals from said sensor during travel of the ski over the surface.

2. The device claimed in claim 1 wherein said surface penetrating member is a keel having appendages thereon for contact with the surface.

3. The device claimed in claim 1 additionally including means attached to said arm assembly for biasing said arm assembly into contact with the surface.

4. The device claimed in claim 3 wherein said means for biasing is positionally attachable at selected distances from the upright axis to vary the degree of biasing said arm assembly.

5. The device claimed in claim 1 wherein said rotary position sensor includes a shaft, said means for rotatably securing said carrier means to said base includes a retainer confining said shaft against rotation.

6. The device claimed in claim 1 wherein said carrier means includes a lock engageable with said arm assembly to prevent relative movement between said carrier means and said arm assembly.

7. The device claimed in claim 1 wherein said arm assembly includes a tang for reception of upwardly and downwardly directed forces.

8. The device claimed in claim 1 wherein said means for storing the signals is a stand-alone data logger in circuit with said rotary position sensor.

9. The device claimed in claim 8 additionally including attachment means for wear by the skier and in which said data logger is carried.

10. A sideslip indicating apparatus for attachment to a ski and including, a base plate for attachment to the ski, a carrier for travel about an upright axis relative said base plate, an arm assembly on said carrier including a surface engaging member responsive to laterally directed loads occurring upon lateral slipping of the ski, a rotary position sensor on said carrier providing signals corresponding to the alternate excursion of the surface engaging member to opposite sides of the longitudinal axis of the ski, and means for storing the signals from said sensor.

* * * * *